(12) United States Patent
Pacella et al.

(10) Patent No.: US 8,571,049 B2
(45) Date of Patent: Oct. 29, 2013

(54) SETTING AND CHANGING QUEUE SIZES IN LINE CARDS

(75) Inventors: Dante J. Pacella, Charles Town, WV (US); Norman Richard Solis, Fairfax, VA (US); Harold Jason Schiller, Silver Spring, MD (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 924 days.

(21) Appl. No.: 12/624,656

(22) Filed: Nov. 24, 2009

(65) Prior Publication Data

US 2011/0122883 A1    May 26, 2011

(51) Int. Cl.
*H04L 12/28*    (2006.01)

(52) U.S. Cl.
USPC ............ 370/412; 370/413; 370/415; 370/417

(58) Field of Classification Search
None
See application file for complete search history.

(56) References Cited

U.S. PATENT DOCUMENTS

| | | | | |
|---|---|---|---|---|
| 6,822,966 B2 * | 11/2004 | Putcha et al. | | 370/411 |
| 7,710,989 B2 * | 5/2010 | Chew | | 370/412 |
| 7,920,569 B1 * | 4/2011 | Kasturi et al. | | 370/392 |
| 2006/0050690 A1 * | 3/2006 | Epps et al. | | 370/359 |
| 2007/0070907 A1 * | 3/2007 | Kumar et al. | | 370/235 |
| 2007/0115957 A1 * | 5/2007 | Noirie et al. | | 370/386 |
| 2007/0286097 A1 * | 12/2007 | Davies | | 370/255 |
| 2010/0265834 A1 * | 10/2010 | Michaelis et al. | | 370/252 |

\* cited by examiner

*Primary Examiner* — Ricky Ngo
*Assistant Examiner* — Thinh Tran

(57) ABSTRACT

A device may include a first line card and a second line card. The first line card may include a memory including queues. In addition, the first line card may include a processor. The processor may identify, among the queues, a queue whose size is to be modified, change the size of the identified queue, receive a packet, insert a header cell associated with the packet in the identified queue, identify a second line card from which the packet is to be sent to another device in a network, remove the header cell from the identified queue, and forward the header cell to the second line card. The second line card may receive the header cell from the first line card, and send the packet to the other device in the network.

21 Claims, 11 Drawing Sheets

SETTING AND CHANGING QUEUE SIZES IN LINE CARDS

BACKGROUND INFORMATION

A typical router performs two functions: a routing function and forwarding function. The routing function includes exchanging routing messages (e.g., route advertisements) with other network devices to generate a forwarding information base (FIB). The forwarding function includes forwarding packets toward their destinations in accordance with forwarding entries in the FIB.

DETAILED DESCRIPTION OF PREFERRED EMBODIMENTS

The following detailed description refers to the accompanying drawings. The same reference numbers in different drawings may identify the same or similar elements.

As used herein, the term "router" may refer to a network level 2 or level 3 (e.g., an Internet Protocol (IP) level) router or switch. The term "packet," as used herein, may refer to an IP packet, datagram, cell, a fragment of an Internet Protocol (IP) packet, or other types of data that may be carried at a specified communication layer.

As used herein, the term "router" may refer to a network level 2 or level 3 (e.g., an Internet Protocol (IP) level) router or switch (e.g., Multiprotocol Label Switching (MPLS) router). Because each of the queues is allocated from the same block of memory, by resizing the queues in accordance with a profile of the traffic received by the router and relevant user configuration, the line card may reduce the likelihood of running out of space in a particular queue and dropping packets that would otherwise be inserted in the particular queue to be forwarded to their destinations. Such a router may provide greater reliability in network communications. Furthermore, the router may coordinate adjusting its queues with other routers. This may lead to greater operator convenience (e.g., automatically setting queue sizes for the routers).

Figure 1:
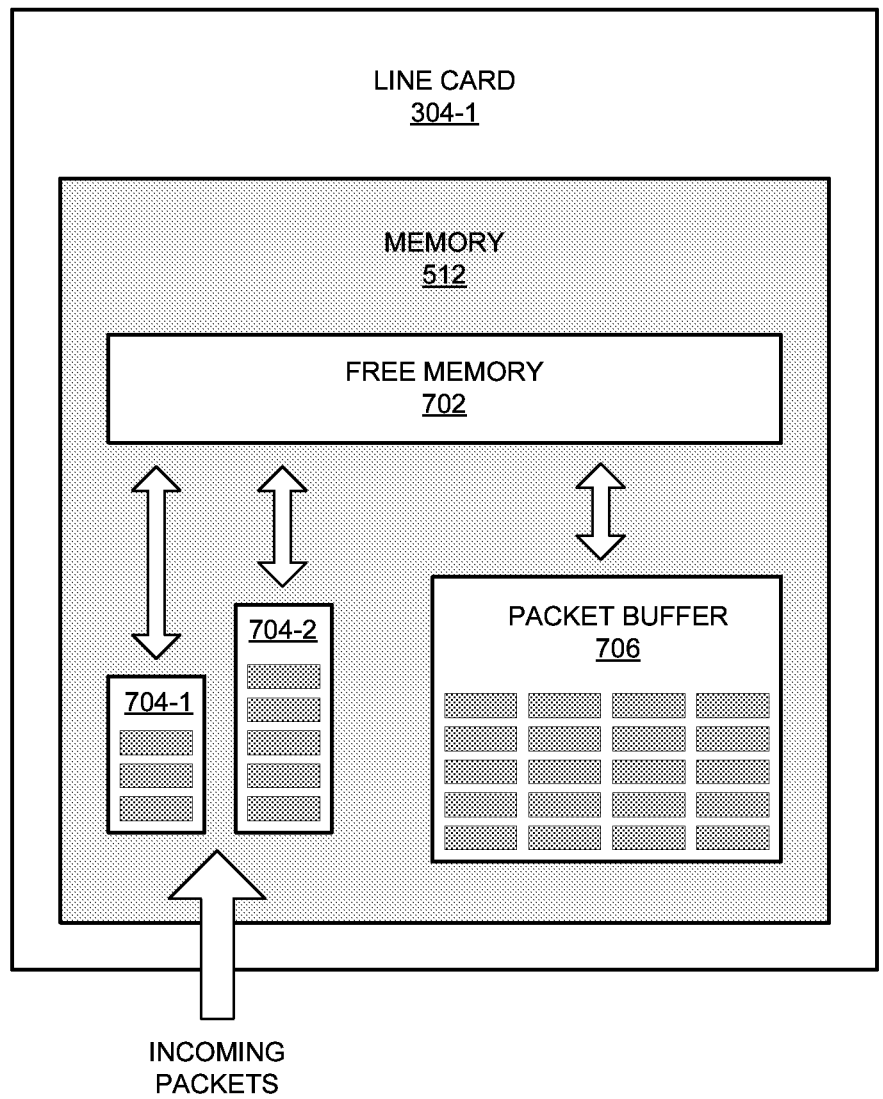
FIG. 1 illustrates concepts described herein.

FIG. 1 illustrates the concepts described herein. As shown, a router may include a line card 304-1 that may send each of the incoming packets to one or more of egress line cards in the router. An egress line card may transmit the received packets toward their destination in a network. As further shown in FIG. 1, line card 304-1 may include memory 512, in which each of the incoming packets are temporarily stored until they are sent to the egress line cards. Memory 506 may include free memory 702, multiple queues, for example, 704-1 and 704-2, and a packet buffer 706.

Free memory 702 may include memory that may be allocated to queues 704-1 and 704-2, and packet buffer 706, depending on different factors, such as how many packet headers each queue 704-1 and 704-2 stores on average, an identity of an application to receive the packets corresponding to the packet headers in the queue, assigned relative weights for each queue, user configurations, attributes of queues in other routers, etc. Queues 704-1 and 704-2 may queue headers of packets of different types (e.g., packets requesting a two different qualities of service). Packet buffer 706 may include payloads of the packets.

As each packet arrives, line card 304-1 may extract a header from the packet. Line card 304-1 may insert the packet header into one of queues 704-1 and 704-2, and place the packet in packet buffer 706. As line card 304-1 forwards each packet header, line card 304-1 may remove the packet header from one of queues 704-1 and 704-2 and the corresponding packet from packet buffer 706.

In FIG. 1, line card 304-1 may modify the sizes of queue 704-1, queue 704-2 and packet buffer 706 in accordance with different criteria, to be described in greater detail below. For example, assume that, on average, line card 304-1 receives more packets for queue 704-1 than for queue 704-2. In such an instance, line card 304-1, depending on the configuration, may modify the size of queue 704-1 relative to the size of queue 704-2. Line card 304-1 may continue to adjust the queue sizes, to avoid dropping packets and/or other undesirable events.

Figure 2:
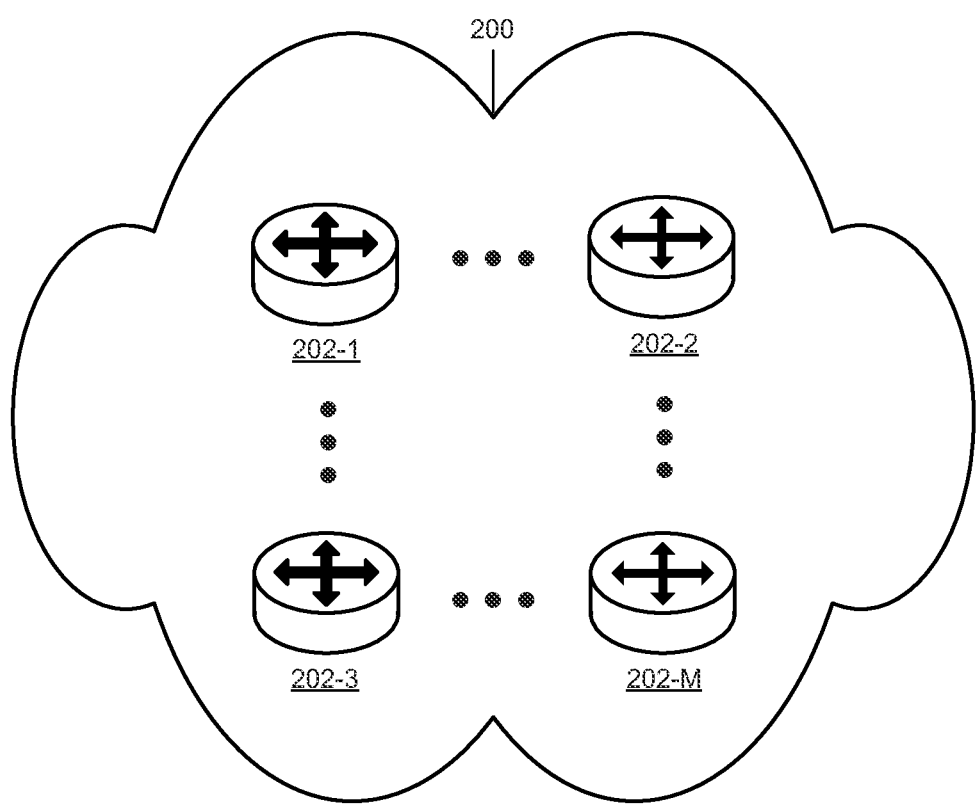
FIG. 2 show an exemplary network in which the concepts described herein may be implemented.

FIG. 2 illustrates a network 200 in which concepts described herein may be implemented. Network 200 may include the Internet, an intranet, a local area network (LAN), a wide area network (WAN), a metropolitan area network (MAN), a cellular network, a public switched telephone network (PSTN), an optical network, an ad hoc network, any other network, or a combination of one or more networks.

As shown in FIG. 2, network 200 may include devices 202-1 through 202-M (collectively "routers 202" and generically "router 202-$x$"). Device 202-$x$ may include, for example, a router, switch, gateway, server, personal computer, mobile computer (e.g., mobile router, laptop computer, etc.), etc. Although device 202-$x$ may be implemented as any computer-like device, in the following description, device 202-$x$ will be described in terms of a router.

Router 202-$x$ may perform routing and forwarding functions. In performing the routing function, router 202-$x$ may exchange messages with other network devices through routing protocols to discover information about reachability of destinations, the network topology, and costs associated with routes. This information is stored in the Routing Information Base (RIB). Best paths for the destinations and their associated egress interfaces are determined and stored in the forwarding information base (FIB). In performing the forwarding function, router 202-$x$ may receive packets from one or more physical communication interfaces/ports, process the packets to determine their destinations, and transmit the packets on one or more physical or logical communication interfaces/ports in accordance with the determined destinations or other properties of the packets. This process may be keyed off of information in the packet headers.

Figure 3:
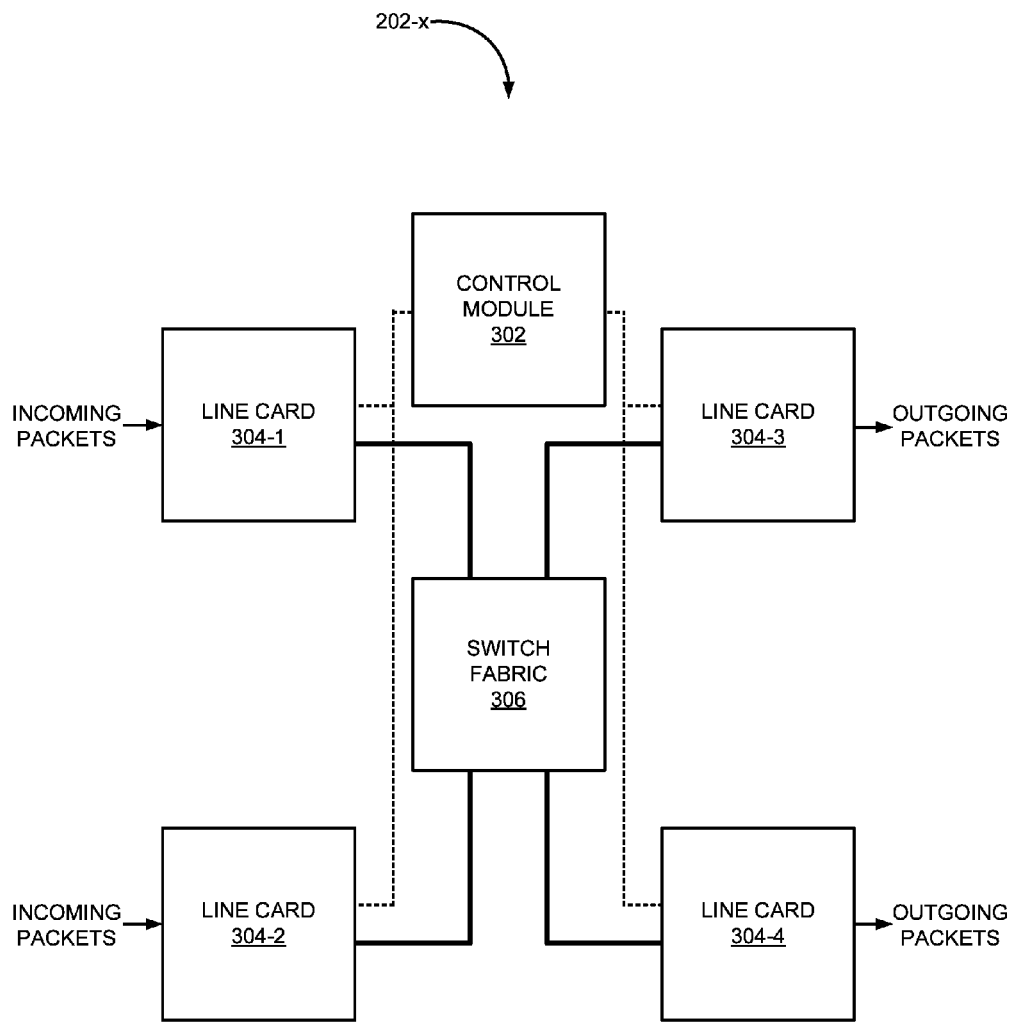
FIG. 3 shows exemplary components of a router of FIG. 2.

FIG. 3 shows exemplary components of router 202-x. As shown, router 202-x may include a control module 302, line cards 304-1 through 304-4 (collectively "line cards 304" and individually "line card 304-x"), and a switch fabric 306. Control module 302 may include components for managing routes, flow statistics, and/or other types of information that may require centralized processing. For example, control module 302 may gather or disseminate routing information from/to other routers 202 in accordance with routing/signaling protocols, organize the routing information in a lookup table, etc. In another example, control module 302 may create a lookup table (e.g., a forwarding information base (FIB)) and distribute the lookup table to line cards 304.

Line card 304-x may include components for receiving packets from devices or components in network 200 and for transmitting the packets to other devices in network 200. In addition, line card 304-x may forward packets, classify packets, etc. In forwarding packets, line card 304-x may act as an ingress line card and/or an egress line card. Switch fabric 306 may convey packets from line cards 304 or other modules (not shown) to other line cards 304 or other modules.

Router 202-x may include fewer, additional and/or different components than those shown in FIG. 3. For example, router 202-x may include additional or fewer line cards or additional control modules. In another example, router 202-x may include components for performing deep packet inspection (DPI), such as identifying network applications that are to receive packets, identifying malicious packets, etc.

Figure 4A:
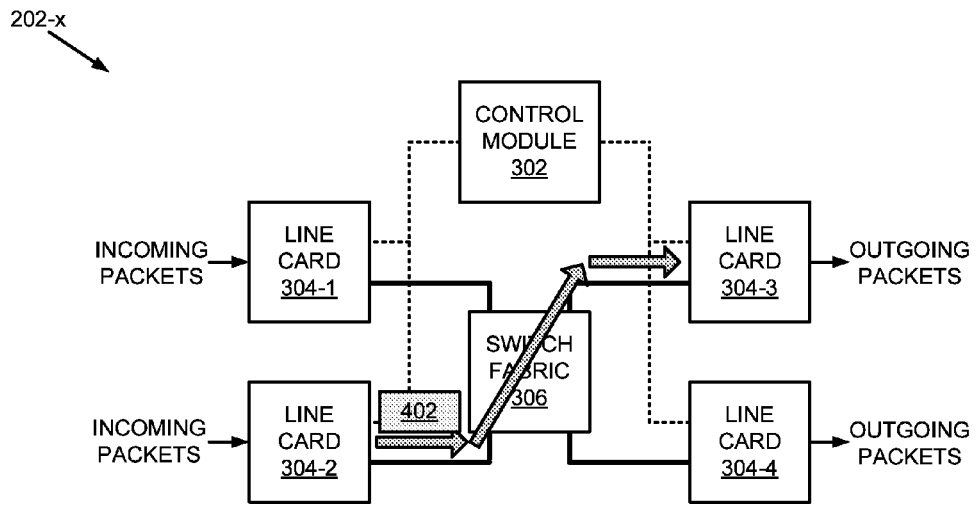
FIGS. 4A and 4B illustrate examples of a line card of FIG. 3 acting as an ingress line card or egress line card.
Figure 4B:
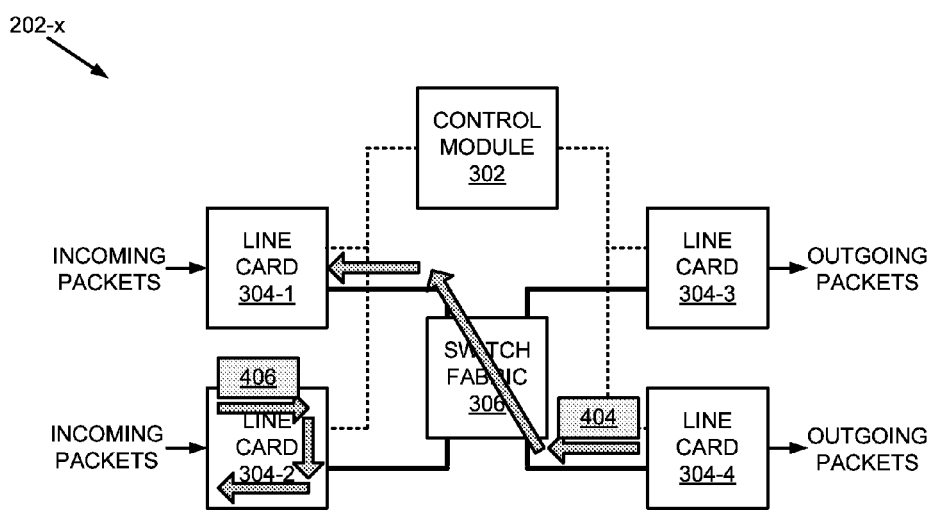

FIGS. 4A and 4B illustrate examples of line card 304-x acting as an ingress or egress line card. In FIG. 4A, line card 304-2 may receive a packet 402 from network 200 via a physical or logical communication port (not shown) and send packet 402 to line card 304-3 via switch fabric 306. In turn, line card 304-3 may forward packet 402 toward its destination in network 200 via another communication port in line card 304-3. In FIG. 4B, line card 304-4 may receive a packet 404 from network 200 and forward packet 404 to line card 304-1 via switch fabric 306. Subsequently, line card 304-1 may send packet 404 toward its destination in network 200. In addition, in FIG. 4B, line card 304-2 may receive packet 406 from network 200 through one port and send packet 406 towards its destination in network 200 through another port. Depending on the implementation, packet 406 may or may not pass through switch fabric 306.

Figure 5A:
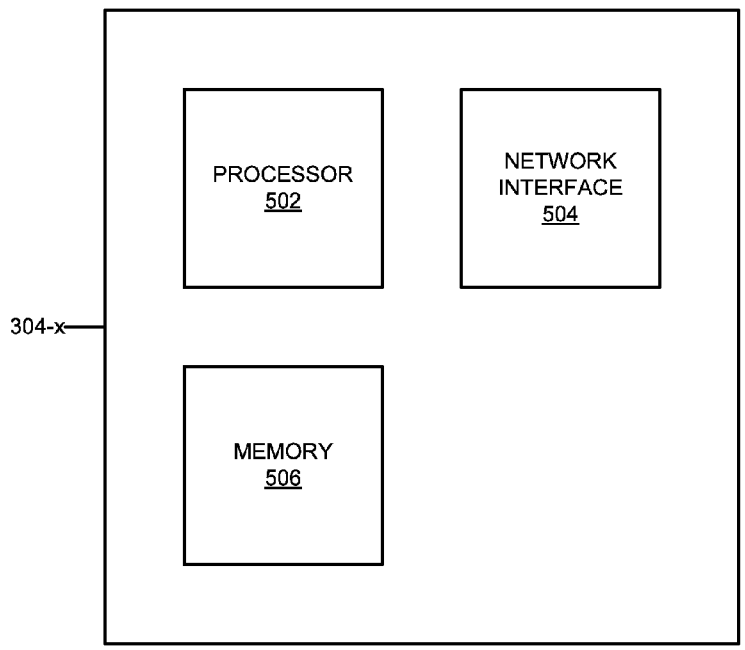
FIG. 5A is a block diagram illustrating exemplary components of an exemplary line card of FIG. 3.

FIG. 5A is a block diagram illustrating exemplary components of line card 304-x. As shown, line card 304-x may include a processor 502, network interface 504, and memory 506. Depending on the implementation, line card 304-x may include additional, fewer, or different components than those illustrated in FIG. 5A.

Processor 502 may include one or more processors, microprocessors, Application Specific Integrated Circuits (ASICs), and/or Field Programmable Gate Arrays (FPGAs), and/or other processing logic. In some implementations, processor 502 may include processors that are dedicated to more specific functions, such as packet processing, packet forwarding, memory management, etc.

Network interface 504 may include one or more physical or logical communication ports that enable line card 304-x to communicate with other devices, line cards, and/or systems. Via the physical ports, network interface 504 may communicate via a network, such as the Internet, a terrestrial wireless network (e.g., a WLAN), a satellite-based network, etc.

Memory 506 may include a static memory, such as read only memory (ROM), and/or dynamic memory, such as random access memory (e.g., DRAM, SDRAM, SRAM, etc.) or onboard cache, for storing data and machine-readable instructions. For example, a component of memory 506 may provide, for example, space for queuing packets, packet headers, etc., before the packets are sent toward one or more egress line cards 304 via switch fabric 306.

Figure 5B:
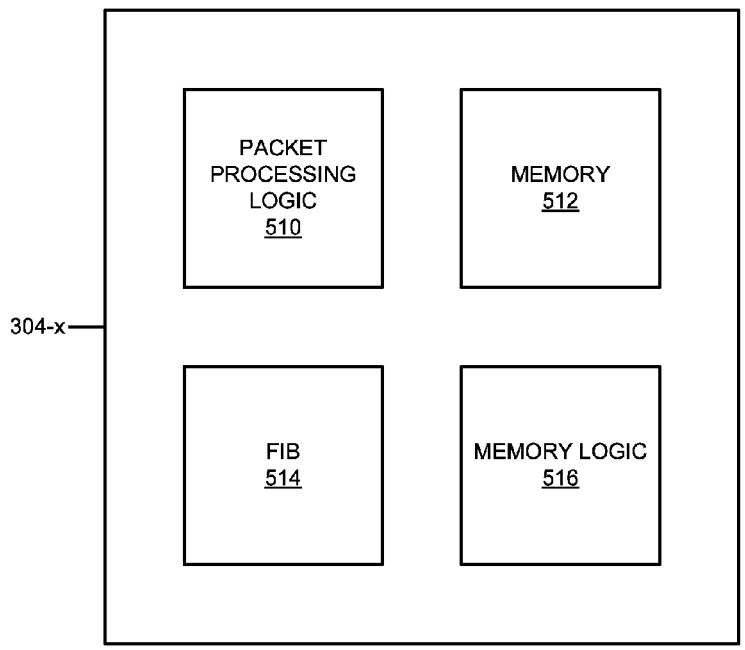
FIG. 5B is a block diagram illustrating exemplary functional components of the line card of FIG. 3.

FIG. 5B is a block diagram illustrating exemplary functional components of line card 304-x. As shown, line card 304-x may include packet processing logic 510, a memory 512, a FIB 514, and memory logic 516. Depending on the implementation, line card 304-x may include additional, fewer, or different components than those illustrated in FIG. 5B. For example, line card 304-x may include a component for storing/measuring flow statistics.

Packet processing logic 510 may place packets that are received at line card 304-x in queues where they are temporarily held, and forward them to egress line cards 304 based on information in FIB 514. In some implementations, packet processing logic 510 may perform additional processing, such as collecting flow statistics, classifying packets, queuing packets, etc.

Figure 6:
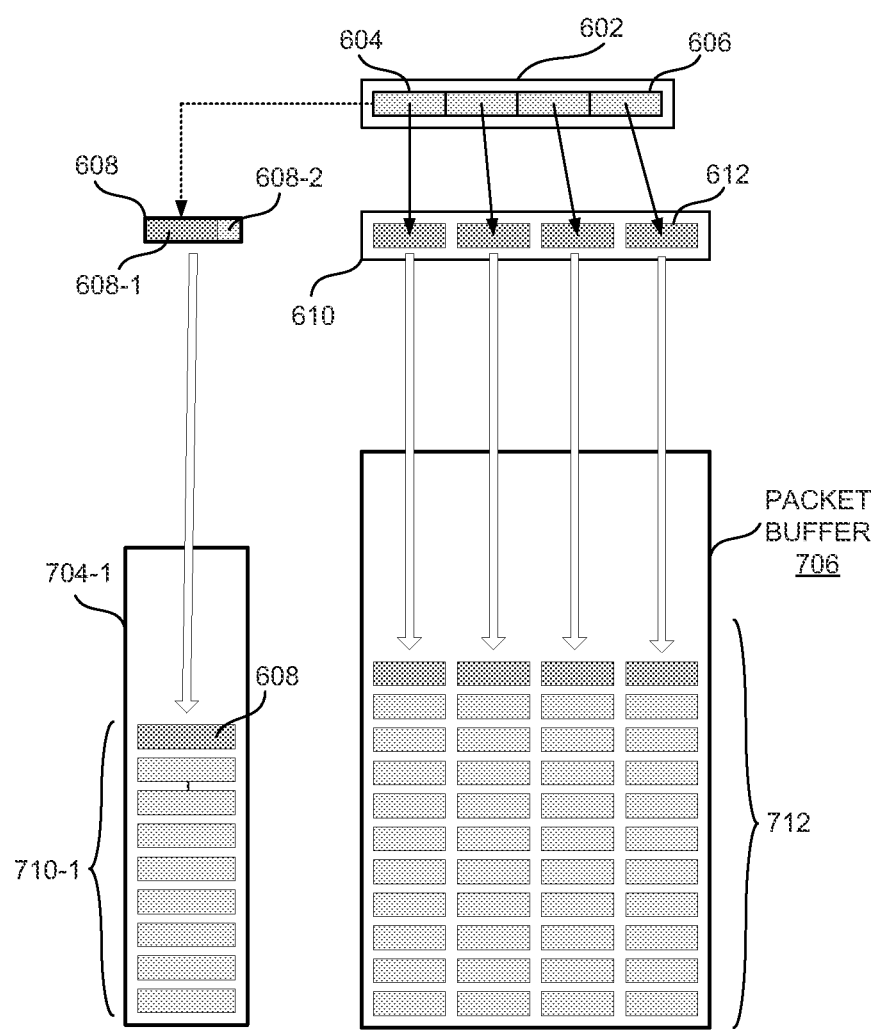
FIG. 6 illustrates exemplary packet processing for cell switching.

FIG. 6 illustrates exemplary packet processing. As shown, when a packet 602 arrives at line card 304-x, packet processing logic 510 may "cellify" the packet, by splitting packet 602 into segments, two of which are shown as packet header 604 and packet tail 606, and packaging each of the segments into packet cells 610 of a fixed length. In some instances, packet processing logic 510 may pad last segment 612 of packet 602 with null bits, to fit the padded segment neatly into a cell 610.

In cellifying packet 602, in addition to generating packet cells 610, packet processing logic 510 may extract header information 608-1 from packet header 604 and add control information 608-2 (e.g., QoS parameters, identifiers for ingress and egress interface, etc.) thereto to generate a header cell 608. Line card 304-x may compensate for any overhead associated with header cell 608 with an excess capacity in cellification, For example, line card 304-x may use 96-byte cells, each with a 32-byte header and 64-byte payload.

Once packet processing logic 510 cellifies packet 602, packet processing logic 520 may send header cell 608 to a queue 704-1 and packet cells 610 to packet buffer 706. Queue 704-1 may include other header cells 710-1 and packet buffer 706 may include other packet cells 712.

Thereafter, header cell 608 and packet cells 610 of packet 602 may remain in queue 704-1 and packet buffer 706, respectively, until packet processing logic 510 processes other header cells 710-1 in queue 704-1. When header cell 608 is ready to be processed, packet processing logic 510 in line card 304-x may look up, based on the destination address in header cell 608, the identity of egress line card 304-y via which packet 602 may leave router 202-x. Line card 304-x may forward header cell 608 and packet cells 610 of packet 602 to egress line card 304-y.

At egress line card 304-y, packet processing logic 510 may examine header cell 608, and use the information in header cell 608 to locate and retrieve each of packet cells 610. Subsequently, line card 304-y may assemble packet 602 for transmission to network 200. Packet processing logic 510 may not reconstruct a packet whose header cell is lost or corrupted, and in such an event, packet processing logic 510 may ignore the corresponding packet cells in packet buffer 706 in egress line card 304-y. Packet processing logic 510 may eventually overwrite the packet cells whose headers are lost or corrupted.

Figure 7A:
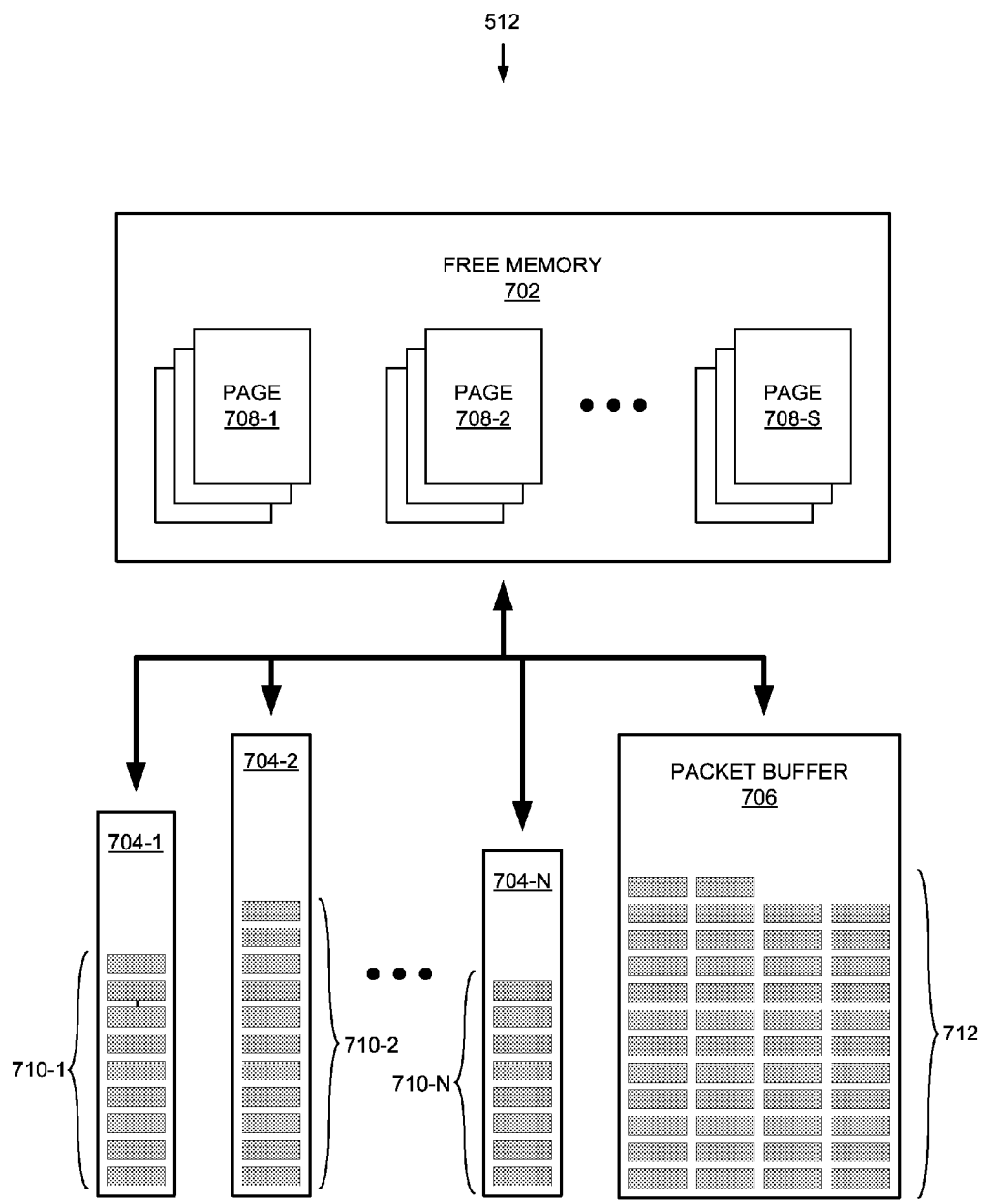
FIG. 7A is a diagram of exemplary functional components of the buffer of FIG. 5B.

Returning to FIG. 5B, memory 512 may provide queues and a buffer for incoming packets. If packets arrive in a burst, the packets may await in the queues/buffer in memory 512 until higher priority packets are processed and/or transmitted to egress line card 304-*y* via switch fabric 306. FIG. 7A is a diagram of functional components of memory 512. As shown, memory 512 may include free memory 702, queues 704-1 through 704-N (collectively "queues 704" and individually "queue 704-*x*"), and a packet buffer 706. Depending on the implementation, memory 512 may include additional, fewer, or different components than those illustrated in FIG. 7A.

Free memory 702 may include a pool of memory from which memory logic 516 may allocate additional memory to queues 704 and packet buffer 706 and to which memory logic 516 may return memory from queues 704 and packet buffer 706. In one implementation, free memory 702 may be organized as pages 708-1 through 708-S. Each page may include a contiguous block of memory (e.g., 4K block). In such an implementation, memory logic 516 may distribute/remove pages 708 to/from queue 704-*x* to change its size. In another implementation, memory logic 516 may resize queue 704-*x* by allocating a new block of memory with the desired size from free memory 702 and copying contents of queue 704-*x* to the new block. Memory logic 516 may return the block previously occupied by queue 704-*x* to free memory 702. In still another implementation, memory logic 516 may resize queue 704-*x* by chaining blocks of memories from free memory 702, as a linked list, for example. Memory logic 516 may use other types of memory allocation/deallocation schemes in other implementations.

Queue 704-*x* may include a first-in first-out (FIFO) buffer for storing header cells. Each of queues 704-1, 704-2 . . . and 704-N may include header cells (e.g., cellified packet headers) of different classes/types, 710-1, 710-2 . . . , and 710-N, respectively. Packet buffer 706 may include packet cells of packets whose headers are in queues 704.

In one implementation, queues 704 may provide for different Qualities of Service (QoS), with each queue 704-*x* having different properties (e.g., queue size/capacity, the rate at which header cells 710-*x* are dequeued (i.e., serviced) for queue 704-1 relative to the other queues 704-*x*, etc). For example, queue 704-1 may have header cells serviced twice as frequently as queue 704-2. In such an implementation, the frequency of service may depend on a feedback mechanism that grants service eligibility based on a service time allotment, how many packets have been serviced during a particular epoch, etc. In other implementations, the frequency may depend on queue configuration. For example, queue 704-*x* may be configurable as a blocking queue that guarantees services to any header cells 710-*x* in queue 704-*x* until other queues 704 return to service eligibility.

In some implementations, queue 704-*x* may enforce a Weighted Random Early Discard (WRED) discipline. In such implementations, queue 704-*x* may be associated with several queue occupancy thresholds, where each threshold corresponds to a particular QoS. When packet headers 710-*x* in queue 704-*x* occupy more space than a particular occupancy threshold, queue 704-*x* may drop header cells at the head end (i.e., the next cell to be serviced) based on their drop indicators.

In FIG. 7A, the next header cell to be serviced for queue 704-1 is depicted at the bottom of the header cell stack 710-*x*. To service the header cell in accordance with WRED discipline, line card 304-*x* may determine a drop indicator for the header cell. The drop indicator of the header cell may be derived from the QoS profile associated with the header cell's original packet header and its QoS code point value. Accordingly, each queue 704-*x* may provide differentiated levels of services to packets of various classes. In other implementations, queue 704-*x* may enforce a variant of the WRED discipline, sometimes referred to as tail assisted WRED, to drop header cells 710-*x* arriving at queue 704-*x* based on weighted probabilities.

Once queue 704-*x* is full, however, queue 704-*x* may tail-drop any arriving packet header, and therefore, line card 304-*x* may drop the packet to which the packet header belongs. This may occur indiscriminately, regardless of queue priorities or packet properties (e.g., QoS). Consequently, in such situations, queue 704-*x* may no longer support differential QoS.

To avoid such situations, memory logic 516 may modify the size of each queue 704-*x* and packet buffer 706 based on changing network conditions and operator specification. Without such a mechanism, a lower priority queue may end up with better service than a higher priority queue.

For example, assume that queues 704 are sized based on an expected average packet length and available memory in packet buffer 706. In addition, assume that each queue 704-*x* receives service based on the number of header cells 710-*x* in queue 704-*x*. In such a case, if the average length of packets associated with header cells 710-*x* in queue 704-*x* becomes smaller than the expected average length, queue 704-*x* may receive less service than lower priority queues 704 whose sizes do not change. Here, the amount of received service is calculated as a percentage throughput of queue 704-*x* relative to the total throughput of queues 704. Conversely, if the average length of packets associated with header cells 710-*x* in queue 704-*x* becomes larger than the expected average length, queue 704-*x* may receive more service than higher priority queues 704 whose sizes do not change.

In extreme situations, without the ability to vary the queue sizes, queue 704-*x* may become inoperable. In network 200, most of traffic handled by routers 202 can contain packets of different lengths. Consequently, a burst of small packets (i.e., packets whose lengths are below the average) can arrive at a communication port associated with queue 704-*x* and cause queue 704-*x* to be flooded with header cells 710-*x*, prematurely exhausting queue 704-*x* independent of the memory available in packet buffer 706. As described below, this may be avoided or ameliorated by allowing the size of each queue 704-*x* to adapt based on changing network conditions and/or operator specification.

Returning to FIG. 5B, FIB 514 may include a lookup table used for forwarding packets. Given a packet's destination address in packet header 604, line card 304-*x* may lookup, in FIB 514, a routing entry whose address prefix provides the longest match to the destination address of the packet. When the routing entry is found in FIB 514, line card 304-*x* may forward header cell 608 in queue 704-*x* and packet buffer 706 to egress line card 304-*y* via switch fabric 306. Subsequently, egress line card 304-*y* may assemble packet 602 from header cell 608 and corresponding packet cells and transmit packet 602 toward its destination via network 200.

Memory logic 516 may allocate memory from free memory 702 (FIG. 1 and FIG. 7) to queues 704 in memory 512, and return freed memory from queues 704 to free memory 702. In some implementations, memory logic 516 may not modify zero or more queues 704, which may be statically assigned memory in an inelastic manner.

Initially, (e.g., before router 202-*x* begins to forward packets), memory logic 516 may determine values of attributes that are associated with queues 704 (e.g., the initial queue sizes, weights, queue priorities, etc.). In some configurations, router 202-*x* may obtain the attributes based on messages that router 202-*x* exchanges with other routers. In other configurations, an operator may set the property values in router 202-*x* via a user interface (e.g., a graphical user interface (GUI)).

Memory logic 516 may use the attributes to configure each queue 704-*x*, such as assign a queue name, set a queue size, assign WRED thresholds, set priorities, set packet loss priority, set queue priority, set code point values for Differentiated Services Code Point, etc.), etc.

When the attributes are set, memory logic 516 may maintain each of queues 704 in accordance with the attributes and statistical analyses of received packets in each queue 704-*x*. In adjusting queue sizes, memory logic 516 may use information such as average number of header cells 710-*x* in each queue 704-*x*, an identity of an application to receive packets corresponding to header cells 710-*x* in a particular queue 704-*x*, weights assigned to the queues, etc.

Figure 7B:
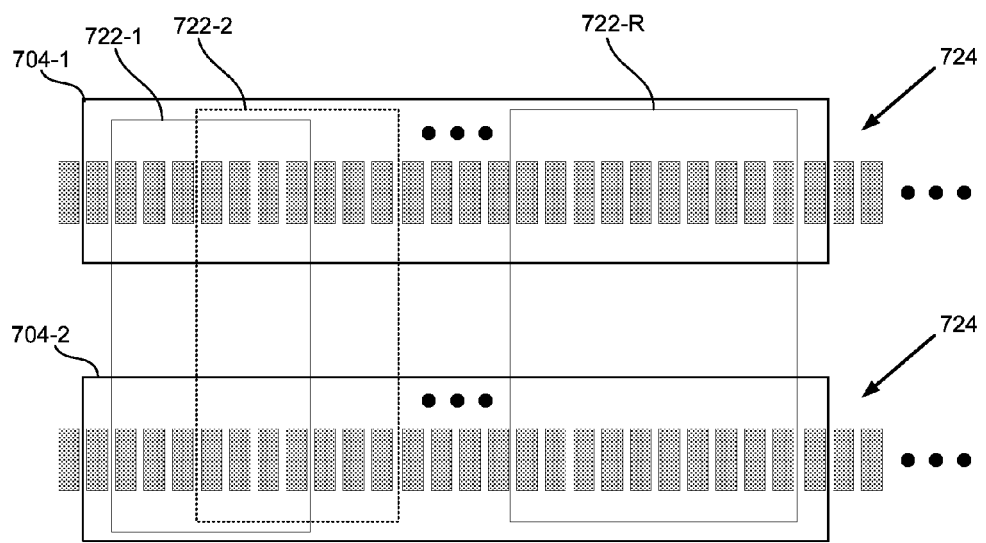
FIG. 7B is a diagram of an exemplary sliding time window.

In one implementation, memory logic 516 may obtain, for each queue 704-*x*, the packet and queue statistics over a sliding time window. FIG. 7B illustrates an exemplary sliding time window 722-*x* from time instance 1 to time instance N. Sliding time window 722-*x* may correspond to a time interval of particular duration (e.g., 3 min). As shown, the number of packets in sliding time windows 722 may vary.

As shown in FIG. 7B, as packets 724 that correspond to header cells 710-*x* in queues 704-1 and 704-2 arrive and enter sliding time window 722-*x*, oldest packets may leave sliding time window 722-*x* in the direction indicated by arrow AA. For a given instance of time, line card 304-*x* may obtain packet statistics/data, such as the average packet size, QoS of each packet, destination addresses, etc. for the duration of sliding time window 722-*x*.

FIG. 7B shows packets that are in sliding time window 722-*x* at times $t_1, t_2 \ldots$, and $t_R$ and whose header cells 710-*x* are in queue 704-*x* as windows 722-1, 722-2 ..., and 722-R, respectively. Accordingly, line card 304-*x* may obtain queue statistics (as distinguished from packet statistics) over sliding time window 722-*x* by averaging queue attributes/parameters at $t_1$ through $t_R$. For example, line card 304-*x* may determine an average number of packets in queue 704-1 by averaging the number of header cells 710-1 for queue 704-1, as well as collectively for all queues 704 over the duration of sliding time window 722-*x*.

In FIG. 7B, because obtaining a queue/packet statistics involves computing a moving average over the time spanned by sliding time window 722-*x*, large variations in measurements that are short-lived may not result in changes in queue attributes. For example, memory logic 516 may not change the size of queue 704-1 upon observing minor fluctuations in the average number of header cells 710-1 in queue 704-1 (e.g., a measured percentage of total packets serviced at queue 704-1). In contrast, when memory logic 516 observes a sudden burst in a particular type of traffic and an increase in the number of small packets, memory logic 516 may also observe a change in the ratio of the average size of packet headers to the average size of payloads. Accordingly, memory logic 516 may decrease the size of packet buffer 706.

In modifying queue sizes, memory logic 516 may rely on properties that are associated with different ports/interfaces associated with queues 704. For example, assume that queue 704-1 has been created to service packets from ingress port X (not shown), and queue 704-2 has been created to service packets from ingress port Y (not shown). In such a case, memory logic 516 may apply a set of rules that are associated with port X to queue 704-1 and another set of rules that are associated with port Y to queue 704-2. For example, in one implementation, memory logic 516 may adjust the sizes of queues 704 based on a "borrowing status," "lending status" of a port (e.g., whether a queue that is created to service with a port may borrow or lend memory from or to other queues), and/or the port's preemption status (e.g., a port with a higher preemption status may borrow from another port with lower preemption status).

Figures 8A, 8B:
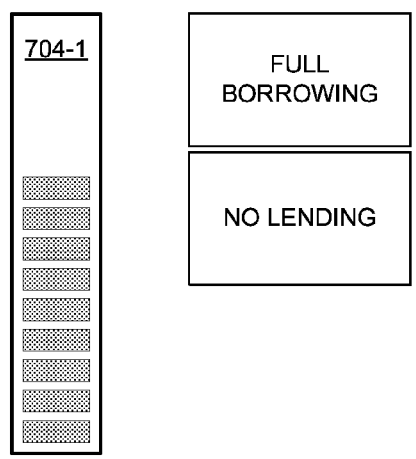
FIG. 8A illustrates different levels of exemplary memory lending and borrowing statuses that may be associated with a port in a line card of FIG. 3.
FIG. 8B illustrates an exemplary queue that is associated with a port in the line card of FIG. 3.

FIG. 8A illustrates different levels of borrowing and/or lending statuses for a port in line card 304-*x*. As shown, a port's borrowing level 804 may be "full borrowing" (e.g., a queue associated with the port may receive any amount of available memory from another queue 704-*x* or free memory 702), "limited borrowing" (e.g., the queue may receive up to a predetermined amount of memory), or "no borrowing" (e.g., the queue cannot receive memory from another queue). The port's lending level 806 may be "full lending" (e.g., the queue may lend any amount of memory), "limited lending" (e.g., the queue may lend up to a predetermined amount of memory), and "no lending" (e.g., the queue may not lend any memory).

FIG. 8B illustrates queue 704-1 that is associated with port X. Assume that port X's borrowing and lending statuses are, respectively, "full borrowing" and "no lending." Accordingly, when queue 704-1 is running out of memory, memory logic 516 may allocate, to queue 704-1, additional memory (e.g., additional pages 708) from another queue 704-*x* whose lending status is "full lending."

In some implementations/configurations, a port in line card 304-*x* may function as a backup to another port. In such instances, the backup port may not normally be in use, and therefore, be assigned "full lending" and "no borrowing" statuses. That is, queue 704-*x* associated with the port may lend its memory, but not borrow memory from other queues 704. In the event the other port fails, however, the backup port may inherit the borrowing and lending statuses of the failed port. Memory logic 516 may return memories of queues 704 that are associated with the failed port to free memory 702 or lend the freed memory to other queues, until the failed port recovers.

In some implementations, router 202-*x* may allow an operator to define or specify administrative groups associated with a collection of ports, such as Standard Customer status (e.g., a queue associated with the port cannot borrow memory), Shadow (e.g., the queue can lend memory), Peer (e.g., the queue may borrow/lend a limited amount of memory), Infrastructure (e.g., the queue may borrow any amount of memory from queues 704 associated with non-Infrastructure ports), etc.

Figure 9A:
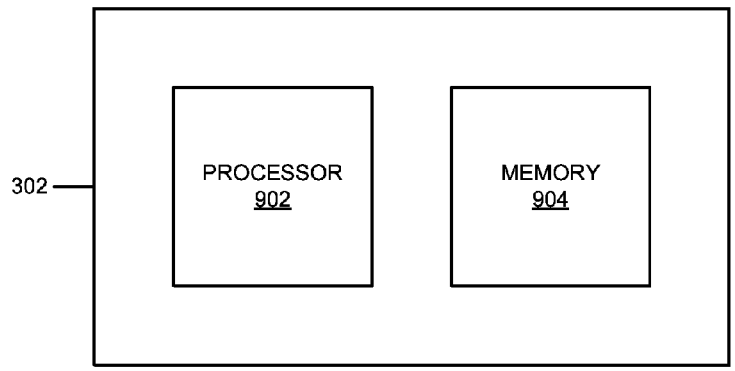
FIG. 9A is a block diagram illustrating exemplary components of the control module of FIG. 3.

FIG. 9A is a block diagram illustrating exemplary components of control module 302. As shown, control module 302 may include a processor 902 and a memory 904. Depending on the implementation, control module 302 may include additional, fewer, and/or different components than those illustrated in FIG. 9A.

Processor 902 may include one or more processors, microprocessors, ASICs, and/or FPGAs, and/or other processing logic. In some implementations, processor 902 may include processors dedicated to more specific functions, such as memory management, packet inspection, etc. Memory 904 may include static memory, such as read only memory (ROM), and/or dynamic memory, such as random access memory (e.g., dynamic RAM (DRAM), synchronous DRAM, static RAM (SRAM), etc.), or onboard cache, for storing data and machine-readable instructions. In addition, memory 904 may also include storage media, such as a magnetic and/or optical storage/recording medium. In some implementations, a portion of memory 904 may be mounted under a directory or mapped to a drive.

Figure 9B:
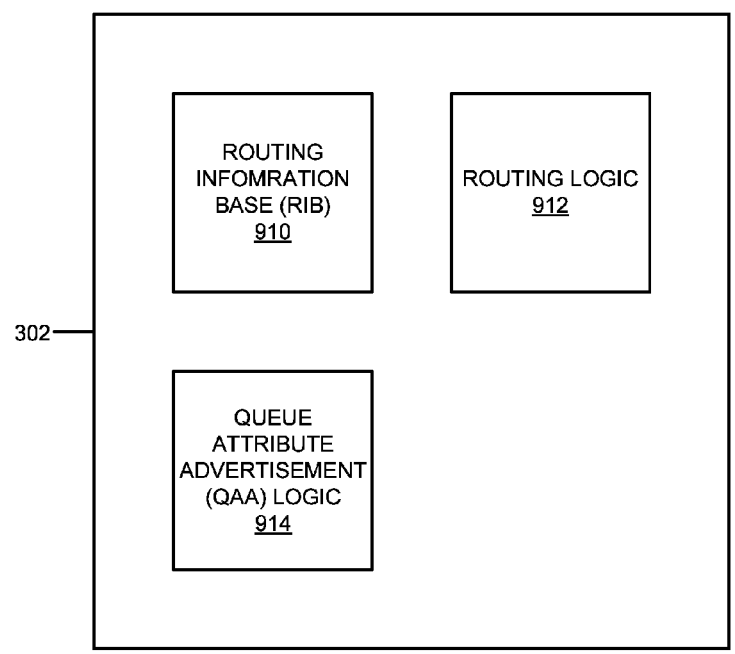
FIG. 9B is a block diagram illustrating exemplary functional components of the control module of FIG. 3.

FIG. 9B is a block diagram illustrating exemplary functional components of control module 302. As shown, control module 302 may include a routing information base (RIB) 910, routing logic 912, and queue attribute advertisement (QAA) logic 914. Depending on the implementation, control module 302 may include additional, fewer, or different functional components. For example, in one implementation, control module 302 may include a firewall application, packet inspection application, a copy of forwarding information base (FIB), label information base (LIB), etc. In another example, routing logic 912 and QAA logic 914 may be integrated as a single component.

RIB 910 may include descriptions of paths and metrics under different routing protocols. Routing logic 912 may include hardware and/or software for communicating with other routers to gather and store routing information in a RIB or LIB, in accordance with one or more routing protocols. Furthermore, routing logic 912 may obtain a list of optimal paths for destinations based on a RIB or LIB, and store associated forwarding information (e.g., next-hop information, egress line card number, etc.) in a FIB or LFIB.

QAA logic 914 may communicate with other QAA logic 914 in routers 202 to exchange or obtain information that is associated with queues (e.g., queue sizes, weights, queue priorities, etc.). In addition, QAA logic 914 in router 202-$x$ may provide a central or coordinated basis for providing uniform, network-wide (global) queue adjustments.

In some implementations, QAA logic 914 may negotiate, with other routers, what queue attributes/properties to support (e.g., limits on queue sizes, a maximum number of queues per line card 304-$x$ in router 202-$x$, different port types, QAA version, etc.). Thereafter, QAA logic 914 may pass the negotiated attributes/properties to line cards 304, where memory logic 516 may set attributes/parameters for each queue 704-$x$, such as queue name, queue size, WRED profiles (e.g., thresholds), packet loss priority, queue priority, code point values for Differentiated Services Code Point, etc.

In some implementations, QAA logic 914 may also exchange, with other routers 202, statistical information collected in sliding time windows. Line card 304-$x$ may use the statistical information received from other routers 202 in adjusting queue sizes.

In some implementations, router 202-$x$ may change its queue sizes when more than a threshold number of routers 202 indicate, via QAA logic 914, changes in network traffic pattern. By setting such a threshold, routers 202 may prevent an isolated incident at a particular router 202-$y$ from having global effect.

Figure 10:
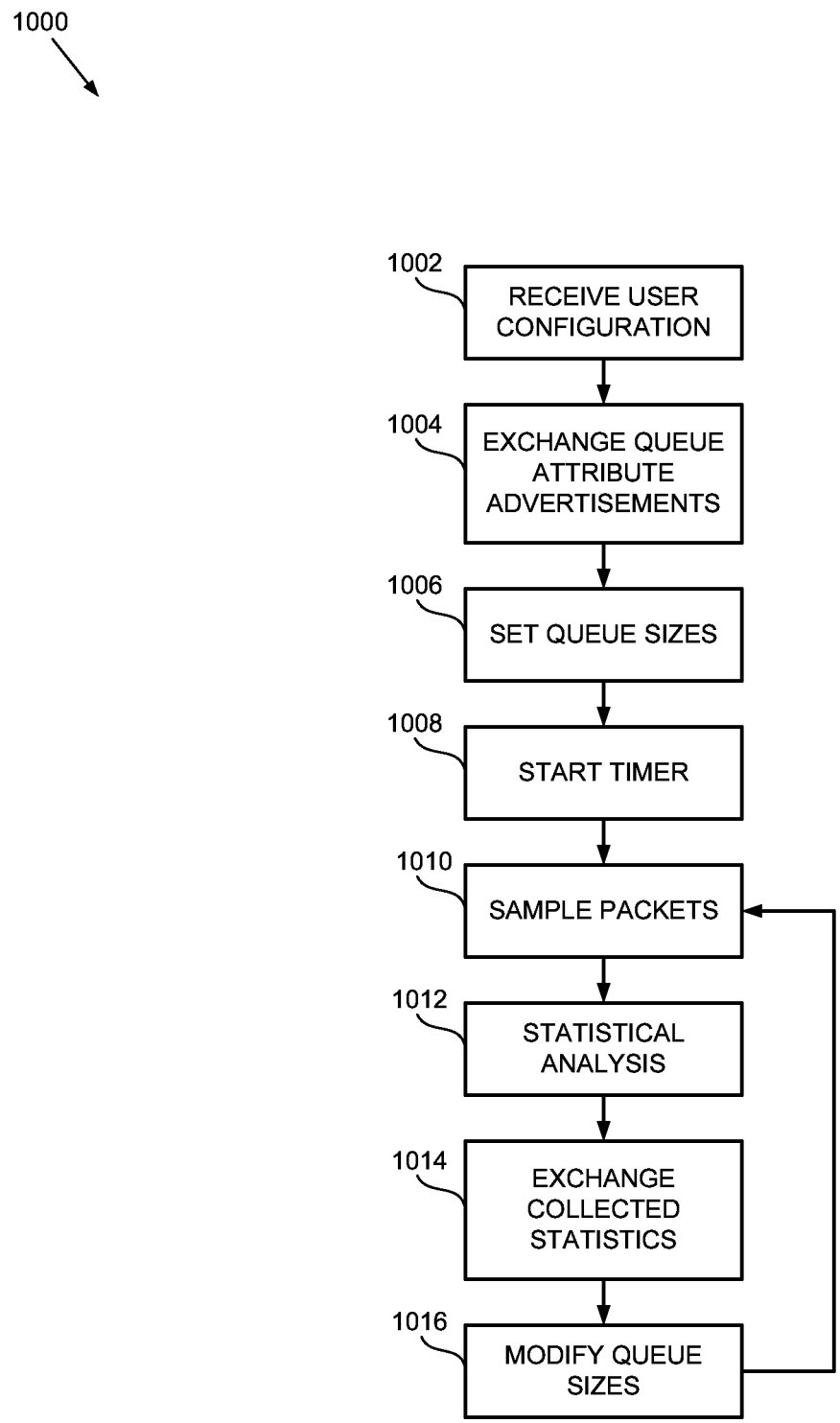
FIG. 10 is a flow diagram of an exemplary process associated with resizing of queues in the buffer of FIG. 5B.

FIG. 10 is a flow diagram of an exemplary process 1000 associated with resizing queues 704 in a memory 512. Process 1000 may begin after a boot up of router 202-$x$. During the boot up, router 202-$x$ may perform bookkeeping tasks, such as mounting a disk, allocating memory, spinning off different processes, etc.

Router 202-$x$ may receive a user configuration (block 1002). For example, routing logic 912, QAA logic 914, or another logic in control module 302 may provide a user interface via which an operator inputs attributes/parameters that are associated with queues 704 in line cards 304. For example, the operator may input initial queue sizes, WRED weights, etc.

In another example, the operator may input a user-defined relationship between multiple queues 704, such as queue priorities (e.g., queue 704-1 receives the priority of "1" and queue 704-2 receives the priority of "0"). As a consequence, queue 704-$x$ with a higher priority may receive additional memory before other lower priority queues 704. In yet another example, the operator may input priorities as a percentage for each queue 704-$x$ to indicate how much memory each queue 704-$x$ may receive (e.g., queue 704-$x$ with 80% may receive four times the memory that queue 704-$y$ with 20%). In still another example, the operator may input the maximum and/or minimum size of queues 704.

Router 202-$x$ may exchange QAA messages with other routers (block 1004). As described above, for example, QAA logic 914 may exchange QAA messages with other routers to negotiate what queue-related attributes to support, exchange information related to queues (e.g., queue sizes, weights, queue priorities, statistical information, etc.), and/or provide central, coordinated basis for rendering uniform, network-wide (global) queue adjustments. This exchange of QAA messages may be useful in cases of high-utilization routers (e.g., routers with more significant sample data) notifying low-utilization routers (e.g., routers with less sample data) of changing conditions so that the low-utilization routers can properly anticipate events.

Router 202-$x$ may set queue sizes (block 1006). For example, router 202-$x$ may set initial queue sizes, weights, and queue priorities based on attributes/parameters that are either provided by QAA logic 914 and/or an operator.

On initialization, router 202-$x$ may start a timer for measuring packet statistics (block 1008). For example, a component in control module 302 (e.g., QAA logic 914) or in line card 304-$x$ (e.g., memory logic 516) may start one or more timers that measure the duration of time intervals for sampling packets in line cards 304. In some implementations, the timer may start just after a boot up, and may be set to trigger (e.g., send an alert to one or more components of router 202-$x$) when the measured time interval is equal to a "bootstrap sample delay time" (e.g., the amount of time for which packet/queue statistics may be obtained just after a boot up). In one implementation, the bootstrap sample delay time may be equal to the default duration of sliding time window 722-$x$.

Router 202-$x$ may sample packets (block 1010) and perform statistical analysis based on the sampled packets (block 1012). For example, memory logic 516 in line card 304-$x$ may determine or compute an average size of packet payloads and/or the number of packets in sliding time window 722-$x$ for each queue 704-$x$.

In other implementations, memory logic 516 may identify, via deep packet inspection, applications (in devices in network 200) that are to receive the packets in queues 704. Furthermore, memory logic 516 may identify which of those applications may require high-bandwidth, low latency, low packet loss, low jitter, etc.

For example, assume that an application A, which is installed on a network device and is to receive some of the packets in queues 704 and 706, requires low jitter. Also, assume that application B, which is installed on another network device and is to receive other packets in queues 704 and 706, requires low latency. In addition, assume that an operator assigns a weight of 2 to low jitter and 1 to low latency. Furthermore, assume that queue 704-1 stores the headers of packets whose destination is application A and queue 704-2 stores the headers of packets whose destination is application B. In such an instance, memory logic 516 may allocate memory to queue 704-1 before allocating memory to queue 704-2. If there is insufficient memory in free memory 702 for both queues 704-1 and 704-2, memory logic 516 may not allocate additional memory to queue 704-2.

Router 202-$x$ may exchange results of the statistical analysis with other routers (block 1014). As described above, QAA logic 914 may exchange QAA messages with other routers, to exchange information that is related to queue sizes. Such exchanges may provide coordinated basis for rendering network-wide queue adjustments.

Router 202-x may modify queue sizes (block 1016). For example, memory logic may use user configuration, exchanged queue sizes via QAA messages, results of statistical analysis, and/or other data (e.g., results of deep packet inspection) to arrive at optimal queue sizes. In modifying the queue sizes, memory logic 516 may take into consideration borrowing/lending statuses of the ports to which queues 704 are assigned. At block 1016, process 1000 may return to block 1010 to continue to adjust the queue sizes.

In the above, process 1000 illustrate how router 202-x may resize queues 704 in line cards 304. Because each of queues 704 in router 202-x is allocated from the same block of memory, by resizing queues 704 in accordance with their utilization and user configuration, router 202-x may reduce the likelihood of running out of space in particular queue 704-x and dropping packets that would otherwise be inserted in queue 704-x to be forwarded to their destinations. Such a router may provide greater reliability in network communications. Furthermore, router 202-x may coordinate adjusting queues 704 with other routers 202. This may lead to greater operator convenience (e.g., automatically setting queue sizes for routers 202 by exchanging QAA messages).

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

In another example, while a series of blocks have been described with regard to the process illustrated in FIG. 10, the order of the blocks may be modified in other implementations. In addition, non-dependent blocks may represent blocks that can be performed in parallel. Furthermore, some of the blocks may be omitted in different implementations.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

No element, block, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A device comprising:
   a first line card including:
      a memory including different space allocations for queuing of header cells of packets associated with different queues; and
      a processor to:
         identify, among the queues, a queue for which an initial maximum size of the space allocation set for the queuing of the header cells of packets associated with the identified queue is to be modified,
         modify the initial maximum size of the space allocation for the queuing of the header cells of packets associated with the identified queue,
         receive a packet,
         set an initial maximum size of a packet buffer provided for the queuing of the packet,
         increase the initial maximum size of the packet buffer based on an average size of the packets associated with the identified queue, and a maximum number of header cells that the space allocations for the different queues can store,
         insert a header cell, associated with the packet, in the space allocation for the identified queue,
         identify a second line card from which the packet is to be sent to another device in a network,
         remove the header cell from the space allocation for the identified queue, and
         forward the header cell to the second line card; and
   the second line card to:
      receive the header cell from the first line card, and
      send the packet to the other device in the network.

2. The device of claim 1, wherein the identified queue includes:
   weighted random early discard thresholds for handling packet congestion.

3. The device of claim 1, wherein the processor is further configured to:
   obtain statistics over a time window based on packets whose header cells are inserted in the space allocation for the queuing of the header cells of packets associated with the identified queue, and
   determine a target size to which the initial maximum size of the space allocation for the queuing of the header cells of packets associated with the identified queue is to change.

4. The device of claim 3, wherein the statistics include at least one of:
   an average number of the header cells in the space allocation for the queuing of the header cells of packets associated with the identified queue; or
   an average length of packets that correspond to the header cells.

5. The device of claim 3, wherein the time window includes a sliding time window.

6. The device of claim 1, wherein the processor is further configured to:
   modify the initial maximum size of the space allocation for the queuing of the header cells of packets associated with the identified queue based on deep packet inspection that identifies characteristics of applications, in the network, that are to receive packets that correspond to header cells in the queue.

7. The device of claim 6, wherein the characteristics include at least one of jitter, bandwidth, packet loss, or latency.

8. The device of claim 1, wherein the processor is further configured to:
   modify sizes of the space allocations for the queuing of the header cells of packets associated with the different queues based on user input that specifies relative priorities of the queues.

9. The device of claim 1, wherein the processor is further configured to compute the average size of packets based on packet statistics.

10. The device of claim 9, wherein the initial maximum size of the space allocation for the queuing of the header cells of packets associated with the identified queue includes:

memory space to store a number of header cells of packets arriving from the network during a packet burst that lasts up to 100 milliseconds.

11. The device of claim 1, wherein the processor is further configured to:
set the initial maximum size of the space allocation for the queuing of the header cells of packets associated with the identified queue based on user configuration.

12. The device of claim 1, wherein when the processor modifies the initial maximum size of the space allocation for the queuing of the header cells of packets associated with the identified queue, a bootstrap sample delay time has elapsed.

13. The device of claim 1, wherein the device further comprises:
a control module, to:
exchange information related to a maximum size of the space allocation for the queuing of the header cells of packets associated with the different queues with other routers.

14. The device of claim 13, wherein the first line card is further configured to:
set the initial maximum size of the space allocation for the queuing of the header cells of packets associated with the identified queue based on the exchanged information.

15. The device of claim 13, wherein the exchanged information includes at least one of:
statistics obtained over a time window based on packets whose header cells are inserted in the space allocation for the queuing of the header cells of packets associated with the identified queue;
a number of supported queues;
supported port types;
initial values of queue sizes;
initial values for queue weights;
initial values for buffer sizes;
queue priorities;
weighted random early discard (WRED) profiles; or
code point values for differentiated services code point (DSCP).

16. The device of claim 1, wherein the device comprises:
a multiprotocol label switching router.

17. The device of claim 1, wherein the first line card further includes:
ports that are associated with the queues, each port with attributes that specify whether a corresponding queue can borrow or lend memory from or to other queues.

18. The device of claim 17, wherein the attributes include one of:
full borrowing, limited borrowing, or no borrowing.

19. A method comprising:
measuring, over a time interval, an average number of packet headers in a memory space, allocated to a queue, into which headers of packets that arrive at a line card are temporarily stored;
measuring, over the time interval, an average length of the packets;
allocating additional memory from either free memory or re-allocating memory spaces allocated to other queues in the line card when the line card determines that the memory space allocated to the queue is smaller than a desired size for buffering bursts of packets, based on the measured number of packet headers;
increasing a size of the memory space allocated to the queue to the desired size by using the allocated additional memory;
receiving a packet at the line card;
storing a header of the packet in the queue and the packet in a packet buffer;
modifying an initial size of the packet buffer based on the average length of packets and a maximum number of packet headers that the queues in the line card can store; and
forwarding the header from the allocated memory space and the packet from packet buffer in the line card to a second line card.

20. The method of claim 19, wherein measuring the average number of packet headers in the queue includes:
obtaining a moving average of a number of packet headers over a sliding time window.

21. A method comprising:
setting an initial maximum capacity of a storage space, allocated to a queue, of a plurality of queues, into which header cells associated with packets that arrive at a line card are temporarily stored;
exchanging, with routers, messages that include information for determining a desired maximum capacity of the storage space allocated to the queue;
allocating memory from other queues in the line card to the queue when the line card determines that the set maximum capacity of the storage space allocated to the queue is smaller than the desired maximum capacity for buffering bursts of packets, when a number of the routers indicate that the desired maximum capacity exceeds a threshold;
receiving a packet at the line card;
set an initial maximum size of a packet buffer provided for the queuing of the packet;
increase the initial maximum size of the packet buffer based on an average size of the packets that arrive at the line card, and a maximum number of header cells that the space allocations for each of the queues can store;
storing a header cell associated with the packet in the queue; and
forwarding the header cell to a second line card.

* * * * *